(12) United States Patent
Wu

(10) Patent No.: US 8,391,701 B1
(45) Date of Patent: Mar. 5, 2013

(54) ACTUATOR AND CAMERA MODULE HAVING SAME

(75) Inventor: Sung-Ching Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/337,162

(22) Filed: Dec. 26, 2011

(30) Foreign Application Priority Data

Nov. 21, 2011 (TW) ................................ 1001142495

(51) Int. Cl.
*G03B 3/10* (2006.01)
*G02B 7/02* (2006.01)
(52) U.S. Cl. ........................ 396/133; 359/824
(58) Field of Classification Search .................. 396/133, 396/529; 348/373–376; 359/819, 822–824
See application file for complete search history.

(56) References Cited

U.S. PATENT DOCUMENTS 7,430,368 B2 * 9/2008 Lee .................................. 396/76

* cited by examiner

*Primary Examiner* — Clayton E LaBalle
*Assistant Examiner* — Minh Phan
(74) *Attorney, Agent, or Firm* — Altis Law Group, Inc.

(57) ABSTRACT

An actuator includes a base, a stationary frame mounted on the base, a driving member, a moveable frame, and guide poles. The base includes a plate having an aperture and a ring-shaped protrusion extending from the plate and surrounding the aperture. The driving member includes a piezoelectric motor fixed on the base and a ring-shaped transmission unit having a first end surface and an opposite second end surface. The transmission unit rotatably sleeves on the protrusion. The first end surface contacts the piezoelectric motor. The second end surface defines a wedge-shaped groove. The moveable frame includes a body and a wedge-shaped stripe extending from the body toward the wedge-shaped groove. The moveable frame is supported by the second end surface. The wedge-shaped stripe partially or entirely engages in the wedge-shaped groove. The guide poles extend through the moveable frame.

20 Claims, 6 Drawing Sheets

ACTUATOR AND CAMERA MODULE HAVING SAME

BACKGROUND

1. Technical Field

The present disclosure relates to an actuator and a camera module having the actuator.

2. Description of Related Art

With ongoing developments in microcircuitry and multimedia technology, camera modules have become widely used in a variety of consumer electronic devices, such as cellular telephones, notebook computers, digital cameras, personal digital assistants, etc. A typical camera module includes a lens module and an image sensor. In addition, there is a growing demand for developing more camera modules with multiple functions, such as camera modules having actuators with an auto-focus function.

One type of actuator is a step motor, which is used to move the lens module along an optical axis in a camera module to achieve the auto-focus function. However, the step motor needs many transmission mechanisms, such as a driving gear and a number of driven gears to convert rotational movement of the lens module into linear movement along the optical axis. These components take up much space, thus adding to the size of the camera module.

Therefore, it is desirable to provide an actuator and a camera module having the actuator, which can overcome or at least alleviate the limitations described.

DETAILED DESCRIPTION

Figure 1:
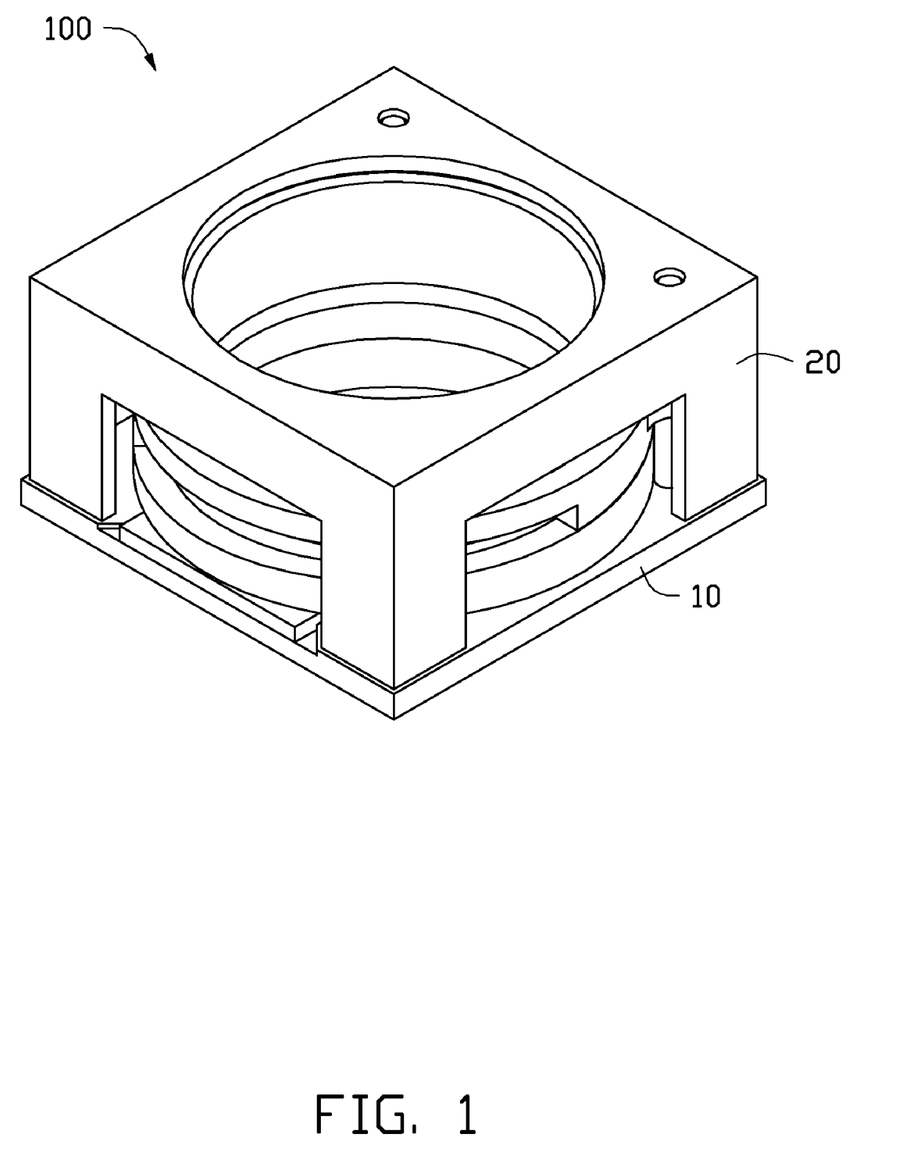
FIG. 1 is an isometric view of an actuator including a stationary frame, according to a first exemplary embodiment.
Figure 2:
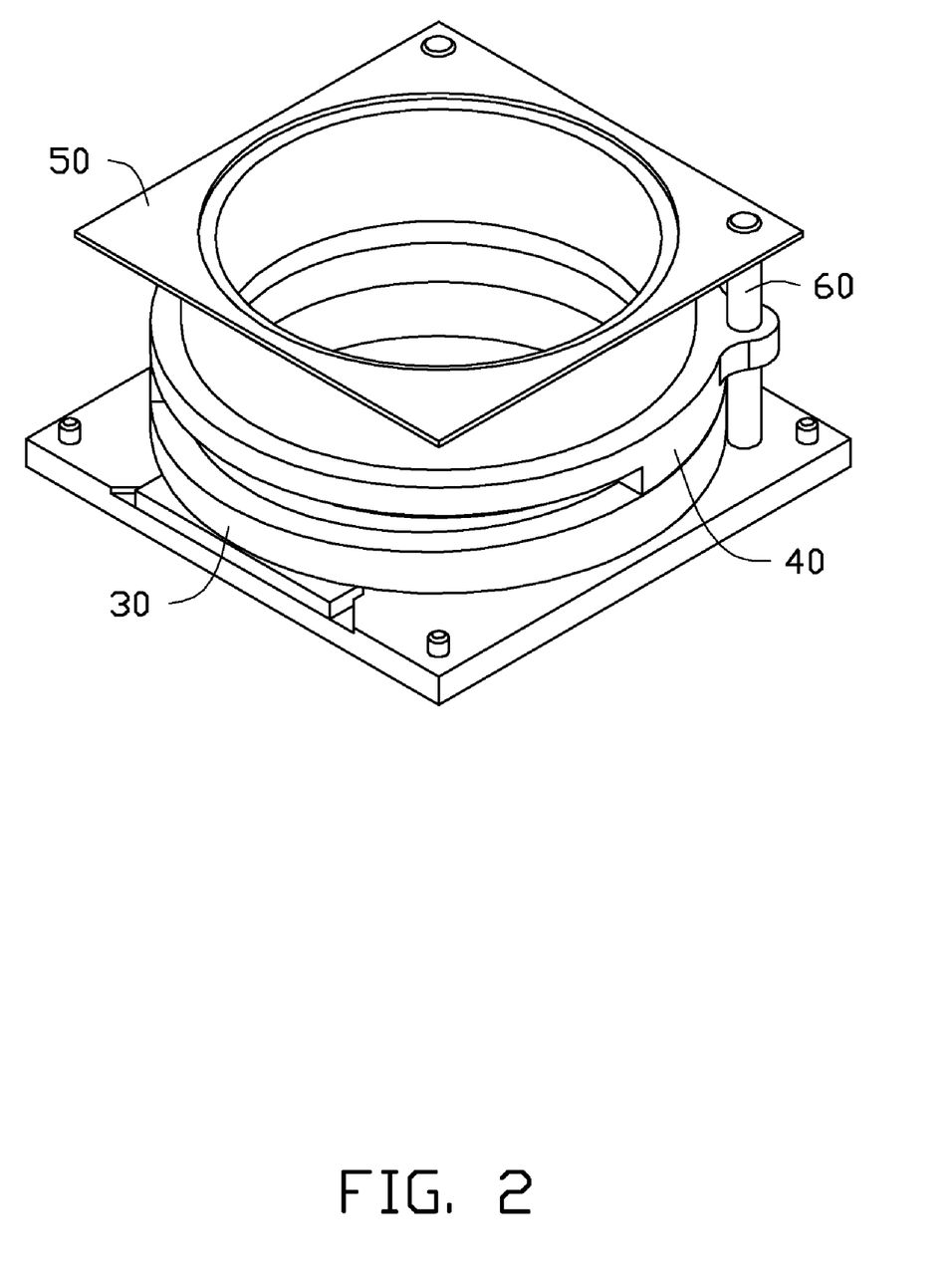
FIG. 2 is similar to FIG. 1, but the stationary frame is removed.

Referring to FIGS. 1-2, an actuator 100, according to a first exemplary embodiment, includes a base 10, a stationary frame 20, a driving member 30, a moveable frame 40, a resilient plate 50, and two guide poles 60.

Figure 3:
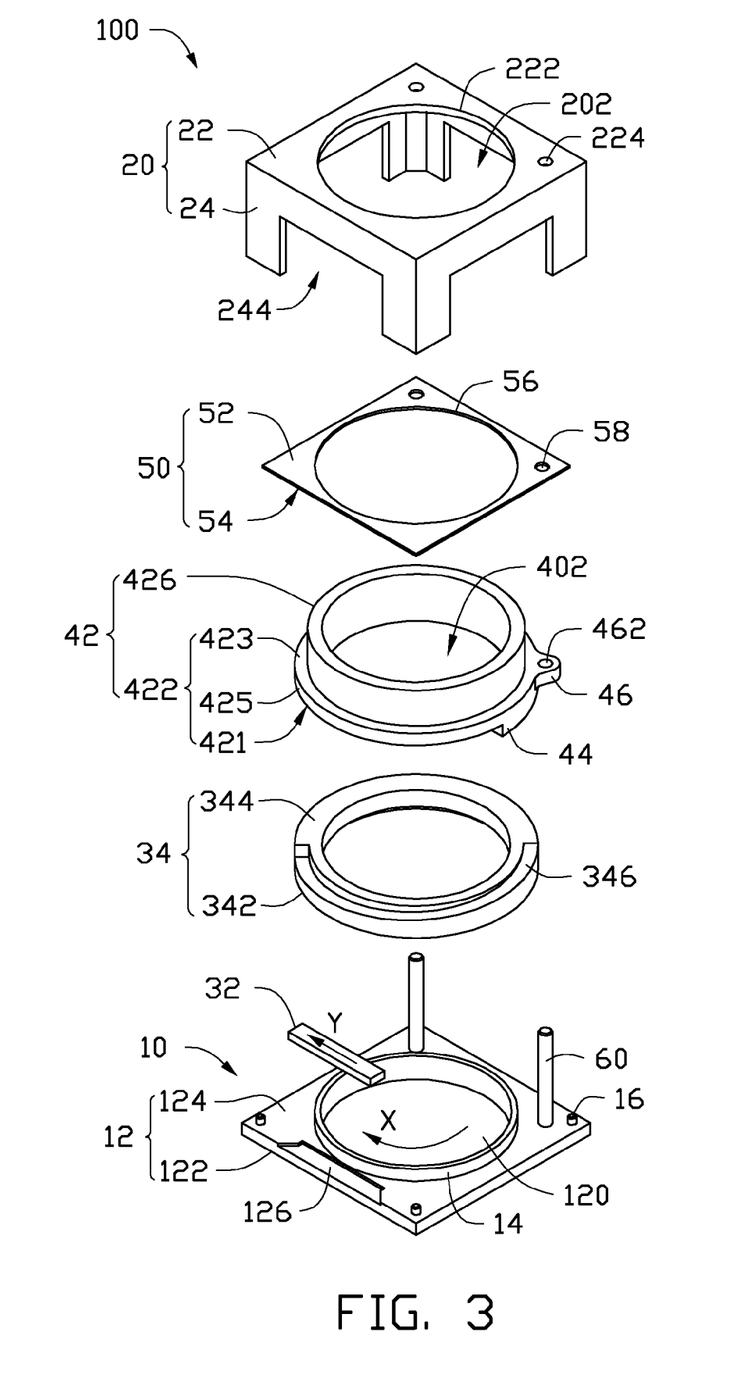
FIG. 3 is an exploded view of the actuator of FIG. 1.
Figure 4:
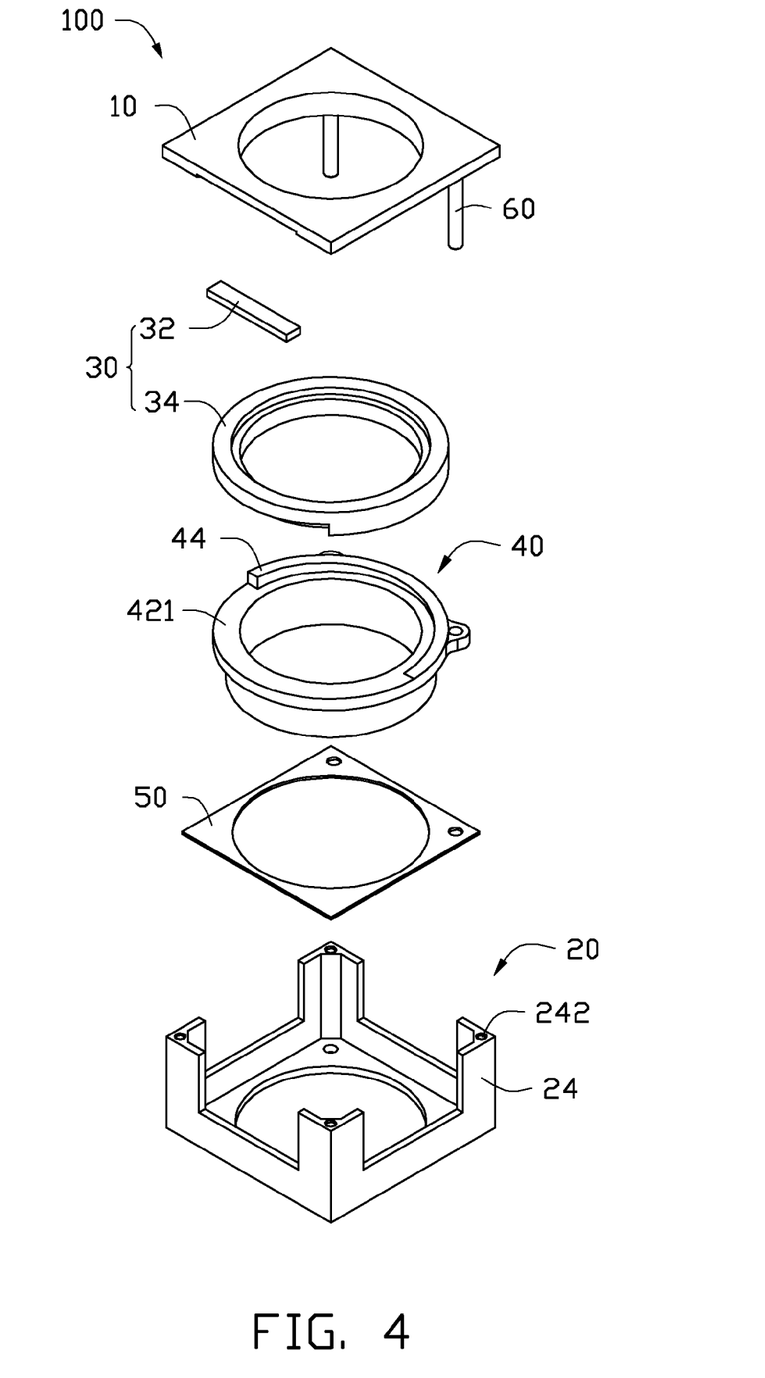
FIG. 4 is similar to FIG. 3, but viewed from another aspect.

Referring to FIGS. 3-4, the base 10 includes a plate 12, a ring-shaped protrusion 14, and four posts 16. The plate 12 is substantially rectangular and includes a bottom surface 122 and a top surface 124. The bottom surface 122 and the top surface 124 are located at opposite sides of the base 10. The base 10 defines a circular aperture 120 and a receiving groove 126. The aperture 120 is positioned in a central portion of the base 10, and extends from the top surface 124 to the bottom surface 122. The receiving groove 126 is positioned at one side of the plate 12 and separate from (i.e., independent of) the aperture 120. The receiving groove 126 passes through the top surface 124, but does not reach the bottom surface 122. The protrusion 14 perpendicularly extends from the top surface 124 and surrounds the aperture 120. A portion of the protrusion 14 is positioned between the receiving groove 126 and the aperture 120. The four posts 16 perpendicularly extend from four corners of the top surface 124. A central axis of the aperture 120 and a central axis of the protrusion 14 are aligned with a central axis of the actuator 100.

The stationary frame 20 includes a top panel 22 and four side panels 24 perpendicularly extending from four peripheral sides of the top panel 22. The top panel 22 and the side panels 24 cooperatively define a first receiving room 202. The top panel 22 defines a circular light incident hole 222 in a central portion thereof, and two fixing holes 224 at two neighboring corners thereof. The two fixing holes 224 are separate from (i.e., independent of) the light incident hole 222. Four engagement holes 242 are defined in four corners of the stationary frame 20 away from the top panel 22. In particular, each of the four engagement holes 242 is located at a corner of the stationary frame 20 where two corresponding side panels 24 meet. The four engagement holes 242 correspond to the four posts 16. In this embodiment, each of the four side panels 24 defines a cutout 244. The cutouts 244 are configured for providing a space for connecting elements inside the stationary frame 20 to elements outside the stationary frame 20. In another embodiment, the four side panels 24 may be unbroken plates.

The driving member 30, the moveable frame 40, the resilient plate 50, and the guide poles 60 are received in the first receiving room 202.

The driving member 30 includes a piezoelectric motor 32 and a ring-shaped transmission unit 34. The piezoelectric motor 32 is substantially an elongated plate and fixedly mounted in the receiving groove 126 with adhesive. The thickness of the piezoelectric motor 32 is equal to the depth of the receiving groove 126. That is, the piezoelectric motor 32 is flush with the top surface 124 after the piezoelectric motor 32 is received in the receiving groove 126. The transmission unit 34 includes a first end surface 342 and a second end surface 344. The first end surface 342 and the second end surface 344 are located at opposite sides of the transmission unit 34. The transmission unit 34 rotatably sleeves on the protrusion 14. The first end surface 342 is supported by the top surface 124 and abuts against the piezoelectric motor 32. A wedge-shaped groove 346 is defined in the second end surface 344. The wedge-shaped groove 346 occupies a portion of the second end surface 344 along the circumferential direction of the transmission unit 34. In this embodiment, the depth of the wedge-shaped groove 346 increases along a clockwise direction (shown as X arrow in FIG. 3), viewed from above the protrusion 14.

The moveable frame 40 is supported by the second end surface 344. The moveable frame 40 includes a body 42, a wedge-shaped stripe 44, and two tabs 46.

The body 42 includes a ring-shaped seat 422 and a hollow cylinder 426. The seat 422 includes a lower surface 421, an upper surface 423, and a circumferential surface 425. The lower surface 421 and the upper surface 423 are positioned at opposite sides of the seat 422. The circumferential surface 425 connects the lower surface 421 to the upper surface 423. The cylinder 426 perpendicularly extends from the upper surface 423. The cylinder 426 and the seat 422 cooperatively form a second receiving room 402 for receiving a lens module 70 (shown in FIG. 5).

The wedge-shaped stripe 44 perpendicularly extends from the lower surface 421 toward the transmission unit 34 and occupies a portion of the lower surface 421 along the circumferential direction of the seat 422. The wedge-shaped stripe 44 is matched with the wedge-shaped groove 346. In the embodiment, the thickness of the wedge-shaped stripe 44 increases along the clockwise direction (Shown as X arrow in FIG. 3), viewed from above the protrusion 14.

The two tabs 46 protrude from the circumferential surface 425 away from the second receiving room 402. Each of the tabs 46 defines a through hole 462. The two through holes 462 correspond to the two fixing holes 224.

The resilient plate 50 includes a first surface 52 and a second surface 54. The first surface 52 and the second surface 54 are positioned at opposite sides of the resilient plate 50. A light passing hole 56 is defined in a central portion of the resilient plate 50. The light passing hole 56 is aligned with the light incident hole 222, the second receiving room 402, and the aperture 120. Two bores 58 are defined at neighboring corners of the resilient plate 50 corresponding to the two through holes 462 and the two fixing holes 224. The first surface 52 is attached to the top panel 22 with adhesive. The second surface 54 abuts against the moveable frame 40 to produce an elastic force. The elastic force makes the moveable frame 40 consistently contact the second end surface 344.

A bottom end of each of the guide poles 60 is fixed to the plate 12, and the other top end of each of the guide poles 60 passes through the corresponding through hole 462 and the corresponding bore 58 to engage in the corresponding fixing hole 224. In the embodiment, the guide poles 60 are made of stainless steel.

In another embodiment, the moveable frame 40, the resilient plate 50, the guide poles 60, and the transmission unit 34 are received in the first receiving room 202, and the piezoelectric motor 32 is positioned outside the first receiving room 202. In addition, the transmission unit 34 may not contact the plate 12 and rotatably sleeves on the protrusion 14 to abut against the piezoelectric motor 32.

In assembly of the actuator 100, the piezoelectric motor 32 is mounted in the receiving groove 126 with adhesive. The transmission unit 34 sleeves on the protrusion 14, and the first end surface 342 is supported by the top surface 124 and abuts against the piezoelectric motor 32. The moveable frame 40 is supported by the second end surface 344, and the guide poles 60 extend through the respective through holes 462. The wedge-shaped stripe 44 partially engages in the wedge-shaped groove 346. The resilient plate 50 is attached to the top panel 22 with adhesive. The posts 16 engage in the respective engagement holes 242 so that the stationary frame 20 is mounted on the base 10. Meanwhile, the guide poles 60 pass through the respective bores 58 and engage in the respective fixing holes 224. The resilient plate 50 abuts against the moveable frame 40 to produce an elastic force, and the elastic force makes the moveable frame 40 consistently contact the second end surface 344.

In another embodiment, the stationary frame 20 may be attached to the base 10 with adhesive. The depth of the wedge-shaped groove 346 may decreases along the clockwise direction (Shown as X arrow in FIG. 3), viewed from above the protrusion 14, and the thickness of the wedge-shaped stripe 44 decreases along the clockwise direction (Shown as X arrow in FIG. 3), viewed from above the protrusion 14.

In addition, the body 42 may be a hollow cylinder and includes a bottom end, a top end, and a sidewall. The bottom end and the top end are positioned at opposite sides of the body 42. The sidewall connects the bottom end to the top end. The wedge-shaped stripe 44 perpendicularly extends from the bottom end toward the transmission unit 34, and the tabs 46 protrude from the sidewall.

When the actuator 100 is in use, if a positive current is applied to the piezoelectric motor 32, the upper surface of the piezoelectric motor 32 will produce a wave deformation along a first direction (shown as Y arrow in FIG. 3). The wave deformation pushes the transmission unit 34 to rotate around the protrusion 14 clockwise (shown as X arrow in FIG. 3), as the lower surface of the piezoelectric motor 32 is attached in the receiving groove 126 with adhesive. During the rotation process, the wedge-shaped stripe 44 gradually retracts from the wedge-shaped groove 346. That is, the portion of the wedge-shaped stripe 44 which engages in the wedge-shaped groove 346 becomes less, and the portion of the wedge-shaped stripe 44 which contacts the second end surface 344 becomes more. The moveable frame 40 together with the lens module 70 is driven to move upward (a direction away from the base 10) along the guide poles 60. When the moveable frame 40 reaches a desired position, the positive current applied to the piezoelectric motor 32 is cut off. The transmission unit 34 stops rotating. The moveable frame 40 and the lens module 70 can remain in the desired position and achieve an auto-focus function. The resilient plate 50 provides a movement space for the moveable frame 40 and the lens module 70.

If a negative current is applied to the piezoelectric motor 32, the upper surface of the piezoelectric motor 32 will produce a wave deformation along a second direction contrary to the first direction. The wave deformation pushes the transmission unit 34 to rotate around the protrusion 14 counter-clockwise, as the lower surface of the piezoelectric motor 32 is attached in the receiving groove 126 with adhesive. During the rotation process, the wedge-shaped stripe 44 gradually enters into the wedge-shaped groove 346. That is, the portion of the wedge-shaped stripe 44 which engages in the wedge-shaped groove 346 becomes more, and the portion of the wedge-shaped stripe 44 which contacts the second end surface 344 becomes less. The moveable frame 40 together with the lens module 70 is driven to move downward (a direction close to the base 10) along the guide poles 60. When the moveable frame 40 reaches a desired position, the negative current applied to the piezoelectric motor 32 is cut off. The transmission unit 34 stops rotating. The moveable frame 40 and the lens module 70 can remain in the desired position and achieve an auto-focus function.

The driving member 30 and the moveable frame 40 cooperatively achieve an auto-focus function of the lens module 70, avoiding the need for many transmission mechanisms. Accordingly, the size of the actuator 100 can be substantially reduced.

In addition, the two guide poles 60 prevent any rotation of the moveable frame 40 relative to the stationary frame 20 when the moveable frame 40 moves upward or downward. Therefore, the optical axis OO' of the lens module 70 always coincides with the central axis of the stationary frame 20 and the accuracy of the auto-focus function is assured.

Figure 5:
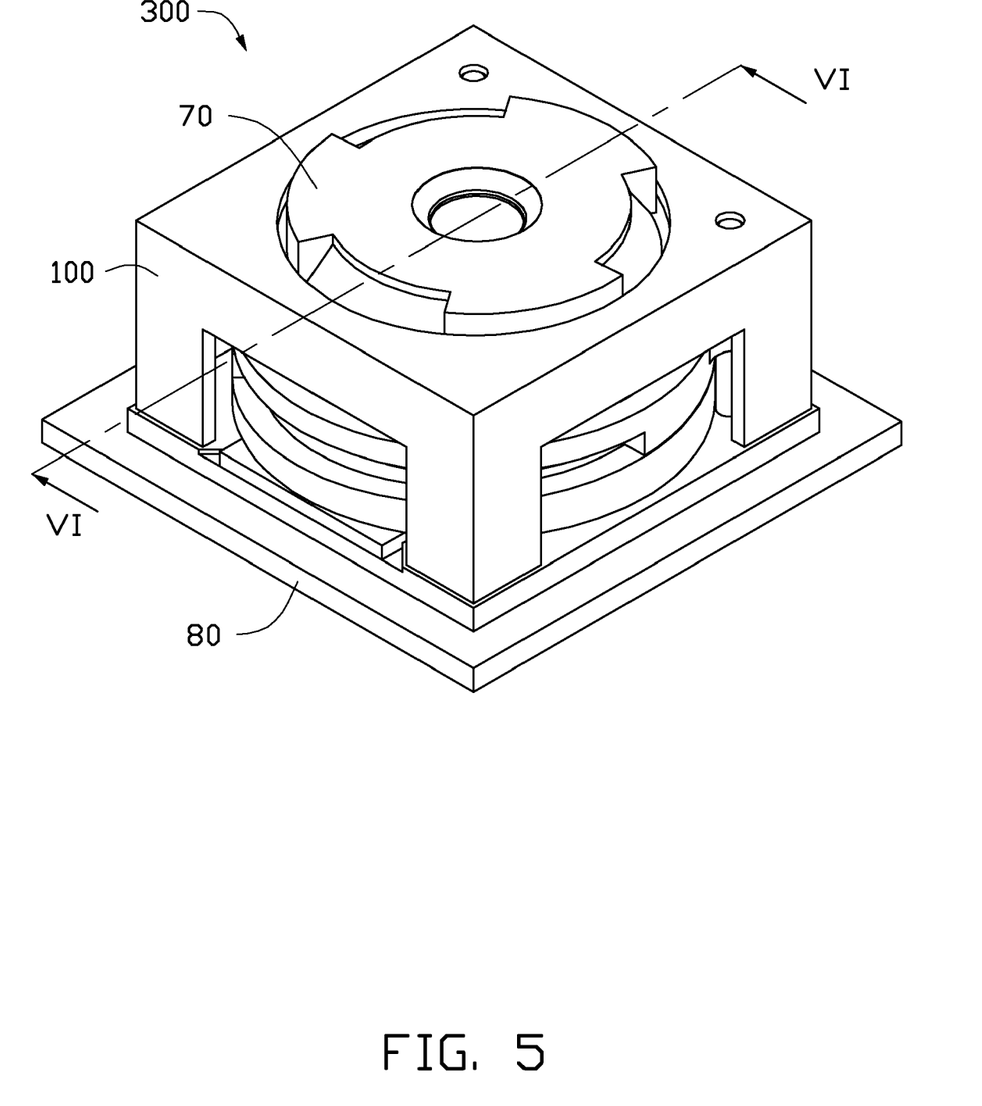
FIG. 5 is an isometric view of a camera module, according to a second exemplary embodiment.
Figure 6:
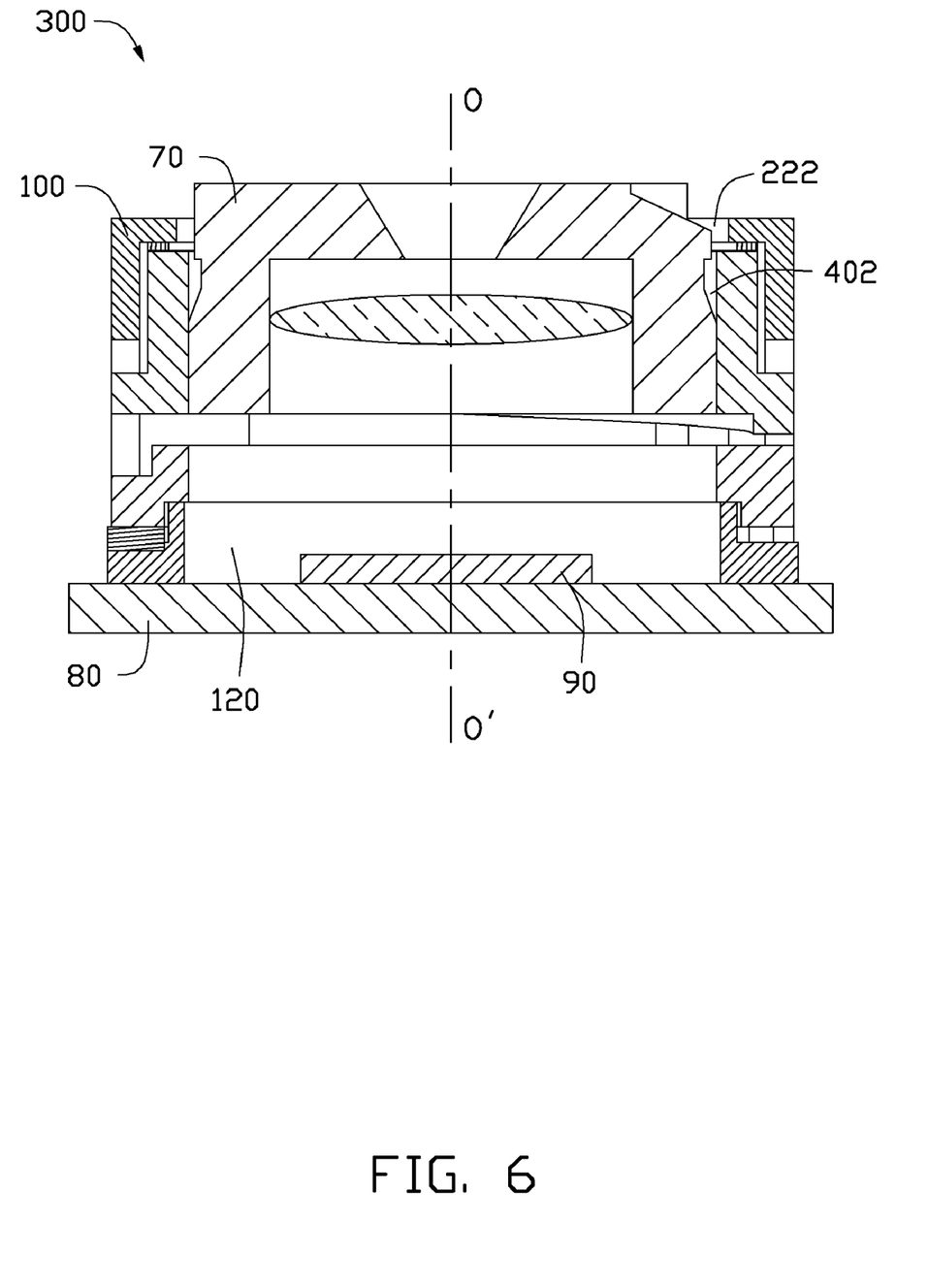
FIG. 6 is a sectional view of the camera module of FIG. 5, taken along line VI-VI thereof.

Referring to FIGS. 5-6, a camera module 300, according to a second exemplary embodiment, is shown. The camera module 300 includes the actuator 100, the lens module 70, a substrate 80, and an image sensor 90. The lens module 70 is received in the second receiving room 402. The actuator 100 is supported by the substrate 80. The image sensor 90 is positioned on the substrate 80 and received in the aperture 120. The optical axis OO' of the lens module 70 is aligned with a center of the image sensor 90 and the center of the light incident hole 222. When the camera module 300 is in use, the moveable frame 40 together with the lens module 70 moves along the optical axis OO', achieving an auto-focus function.

The advantages of the camera module 300 of the second embodiment are similar to those of the actuator 100 of the first embodiment.

Even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An actuator comprising:
a base comprising a plate and a ring-shaped protrusion extending from the plate, the plate defining an aperture, the protrusion surrounding the aperture;
a stationary frame mounted on the base;
a driving member comprising a piezoelectric motor and a ring-shaped transmission unit, the piezoelectric motor fixed on the base, the transmission unit having a first end surface and an opposing second end surface, the transmission unit rotatably sleeving on the protrusion, the first end surface abutting against the piezoelectric motor, the second end surface defining a wedge-shaped groove, the wedge-shaped groove occupying a portion of the second end surface along the circumferential direction of the transmission unit;
a moveable frame comprising a body and a wedge-shaped stripe extending from the body and facing toward the wedge-shaped groove, the moveable frame supported by the second end surface, the wedge-shaped stripe partially or entirely engaging in the wedge-shaped groove; and
two guide poles extending through the moveable frame, one end of each of the two guide poles fixed on the base, the other end of each of the two guide poles fixed on the stationary frame.

2. The actuator of claim 1, wherein the plate comprises a bottom surface and an opposing top surface, the aperture extends from the top surface to the bottom surface, a receiving groove is defined in the top surface and spaced apart from the aperture, and the piezoelectric motor is received in the receiving groove.

3. The actuator of claim 2, wherein the piezoelectric motor is substantially an elongated plate, and the thickness of the piezoelectric motor equals to the depth of the receiving groove.

4. The actuator of claim 2, wherein the piezoelectric motor is substantially an elongated plate, and the thickness of the piezoelectric motor is larger than the depth of the receiving groove.

5. The actuator of claim 2, further comprising a resilient plate, wherein the resilient plate is sandwiched between the stationary frame and the moveable frame, an elastic force applied to the moveable frame by the resilient plate presses the moveable frame to consistently contact the second end surface.

6. The actuator of claim 5, wherein the depth of the wedge-shaped groove increases along a clockwise direction, and the thickness of the wedge-shaped stripe increases along the clockwise direction.

7. The actuator of claim 5, wherein the depth of the wedge-shaped groove decreases along a clockwise direction, and the thickness of the wedge-shaped stripe decreases along the clockwise direction.

8. The actuator of claim 6, wherein the moveable frame further comprises two tabs extending from the body, each of the two tabs defines a through hole corresponding to the guide poles, the two guide poles passes through the respective through holes.

9. The actuator of claim 8, wherein the body comprises a ring-shaped seat and a hollow cylinder, the seat comprising a lower surface, an upper surface opposite to the lower surface, and a circumferential surface connecting the lower surface to the upper surface, the cylinder extends from the upper surface, the wedge-shaped stripe extends from the lower surface, and the two tabs extend from the circumferential surface.

10. The actuator of claim 8, wherein the body is a hollow cylinder and comprises a bottom end, an opposing top end, and a sidewall connecting the top end to the bottom end, the wedge-shaped stripe extends from the bottom end, and the two tabs extend from the sidewall.

11. An actuator comprising:
a base comprising a plate and a ring-shaped protrusion extending from the plate, the plate defining an aperture, the protrusion surrounding the aperture;
a stationary frame mounted on the base;
a driving member comprising a piezoelectric motor and a ring-shaped transmission unit, the piezoelectric motor fixed on the base, the transmission unit having a first end surface, a second end surface, and an arc-shaped first sloping surface, the second end surface and the first sloping surface facing away from the first end surface, the transmission unit rotatably sleeving on the protrusion, the first end surface abutting against the piezoelectric motor, the first sloping surface being slanted with respective to the second end surface and extending along the circumferential direction of the transmission unit;
a moveable frame comprising an engaging surface and an arc-shaped protrusion extending from the engaging surface and facing toward the first sloping surface, the second end surface configured to support the moveable frame, the arc-shaped protrusion having an arc-shaped second sloping surface slanted with respect to the engaging surface, the first sloping surface configured to support the second sloping surface; and
two guide poles extending through the moveable frame, one end of each of the guide poles fixed on the base, the other end of each of the guide poles fixed on the stationary frame, the piezoelectric motor configured to create a wave deformation so as to drive the transmission unit to rotate around the protrusion, thereby the rotation of the transmission unit causing the second sloping surface to move relative to the first sloping surface along the circumferential direction, thus raising or lowering the movable frame along the guide poles relative to the base.

12. The actuator of claim 11, wherein the plate comprises a bottom surface and an opposing top surface, the aperture extends from the top surface to the bottom surface, a receiving groove is defined in the top surface and spaced apart from the aperture, and the piezoelectric motor is received in the receiving groove.

13. The actuator of claim 12, wherein the piezoelectric motor is substantially an elongated plate, and the thickness of the piezoelectric motor equals to the depth of the receiving groove.

14. The actuator of claim 12, further comprising a resilient plate, wherein the resilient plate is sandwiched between the stationary frame and the moveable frame, an elastic force applied to the moveable frame by the resilient plate presses the moveable frame to consistently contact the second end surface.

15. The actuator of claim 11, wherein the arc-shaped first sloping surface is recessed with respect to the second end surface.

16. The actuator of claim 11, wherein the second end surface is a flat surface perpendicular to a central axis of the aperture.

17. The actuator of claim 15, wherein the moveable frame further comprises two tabs extending from the movable frame, each of the two tabs defines a through hole corresponding to the guide poles, and the guide poles pass through the respective through holes.

18. The actuator of claim 16, wherein the engaging surface is a flat surface substantially parallel to the second end surface.

19. The actuator of claim 18, wherein the guide poles are parallel with a central axis of the aperture.

20. A camera module comprising:
an actuator comprising:
- a base comprising a plate and a ring-shaped protrusion extending from the plate, the plate defining an aperture, the protrusion surrounding the aperture;
- a stationary frame mounted on the base;
- a driving member comprising a piezoelectric motor and a ring-shaped transmission unit, the piezoelectric motor fixed on the base, the transmission unit having a first end surface and an opposite second end surface, the transmission unit rotatably sleeving on the protrusion, the first end surface abutting against the piezoelectric motor, the second end surface defining a wedge-shaped groove, the wedge-shaped groove occupying a portion of the second end surface along the circumferential direction of the transmission unit;
- a moveable frame comprising a body and a wedge-shaped stripe extending from the body and facing toward the wedge-shaped groove, the moveable frame supported by the second end surface, the wedge-shaped stripe partially or entirely engaging in the wedge-shaped groove; and
- two guide poles extending through the moveable frame, one end of each of the two guide poles fixed on the base, the other end of each of the two guide poles fixed on the stationary frame;

a lens module received in the moveable frame;
a substrate supporting the actuator; and
an image sensor received in the aperture and supported by the substrate, an optical axis of the lens module aligned with a center of the image sensor.

* * * * *